(12) United States Patent
Keitsch et al.

(10) Patent No.: US 12,469,856 B2
(45) Date of Patent: Nov. 11, 2025

(54) BIPOLAR PLATE HAVING DUCT DIVISIONS PRESENT IN THE ACTIVE REGION, AND A FUEL CELL STACK

(71) Applicant: AUDI AG, Ingolstadt (DE)

(72) Inventors: Oliver Keitsch, Heilbronn (DE); Fabian Lippl, Mannheim (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 400 days.

(21) Appl. No.: 18/042,990

(22) PCT Filed: Jan. 5, 2022

(86) PCT No.: PCT/EP2022/050114
§ 371 (c)(1),
(2) Date: Feb. 24, 2023

(87) PCT Pub. No.: WO2022/148761
PCT Pub. Date: Jul. 14, 2022

(65) Prior Publication Data
US 2023/0378484 A1    Nov. 23, 2023

(30) Foreign Application Priority Data

Jan. 8, 2021   (DE) ...................... 10 2021 100 186.2

(51) Int. Cl.
*H01M 8/0258*   (2016.01)
(52) U.S. Cl.
CPC ................................ *H01M 8/0258* (2013.01)
(58) Field of Classification Search
CPC ............... H01M 8/0258; H01M 8/026; H01M 2008/1095; Y02E 60/50
See application file for complete search history.

(56) References Cited

U.S. PATENT DOCUMENTS

| 7,718,298 B2 * | 5/2010 | Tighe ................... H01M 8/0265 429/513 |
| 2006/0275644 A1 * | 12/2006 | Krause ................ H01M 8/0258 429/432 |

(Continued)

FOREIGN PATENT DOCUMENTS

| DE | 10-2008-033211 A1 | 1/2010 |
| DE | 10-2016-111638 A1 | 12/2017 |

(Continued)

OTHER PUBLICATIONS

International Search Report and Written Opinion, dated Jun. 30, 2022, for International Patent Application No. PCT/EP2022/050114. (7 pages).

*Primary Examiner* — Muhammad S Siddiquee
(74) *Attorney, Agent, or Firm* — Seed Intellectual Property Law Group LLP

(57) ABSTRACT

A bipolar plate for a fuel cell comprises a first reactant flow field on its first plate side and a second reactant flow field on its second plate side, situated opposite the first plate side, wherein the flow fields comprise multiple flow ducts bounded by webs in an active region for one of the two reactants taking part in the fuel cell reaction, wherein each time the active region at the inlet side is fluidically connected via a distribution region running outside of the active region to an inlet-side media port for one of the two reactants, extending from the first plate side to the second plate side, and wherein each time the active region at the outlet side is fluidically connected via a collection region running outside the active region to an outlet-side media port extending from the first plate side to the second plate side. At least one of the flow fields is formed with webs at the inlet side in its active region, which have a bearing surface for a neighboring layer of the fuel cell which is larger than a bearing surface of the outlet-side webs, resulting from a duct (Continued)

division of at least some of the flow ducts which is present in the active region. A fuel cell stack having such a bipolar plate is also provided.

10 Claims, 4 Drawing Sheets

(56) References Cited

U.S. PATENT DOCUMENTS

| | | |
|---|---|---|
| 2007/0178359 A1 | 8/2007 | Peng et al. |
| 2014/0342264 A1* | 11/2014 | Fellows .............. H01M 8/2483 |
| | | 429/535 |
| 2021/0005905 A1* | 1/2021 | Asanin .............. H01M 8/04156 |
| 2023/0253576 A1* | 8/2023 | Keitsch .............. H01M 8/0265 |
| | | 429/400 |

FOREIGN PATENT DOCUMENTS

| | | |
|---|---|---|
| DE | 10-2018-202561 A1 | 8/2019 |
| EP | 2026393 A1 | 2/2009 |
| JP | 2004079245 A | 3/2004 |

* cited by examiner

BIPOLAR PLATE HAVING DUCT DIVISIONS PRESENT IN THE ACTIVE REGION, AND A FUEL CELL STACK

BACKGROUND

Technical Field

Embodiments of the invention relate to a bipolar plate for a fuel cell, which is formed with a first reactant flow field on its first plate side and which is formed with a second reactant flow field on its second plate side, situated opposite the first plate side. Embodiments of the invention furthermore relate to a fuel cell stack having such a bipolar plate.

Description of the Related Art

Fuel cell devices are used for the chemical transformation of a fuel with oxygen to form water in order to generate electric energy. For this, fuel cells contain as their key component the so-called membrane electrode assembly (MEA), which is an assemblage of a proton-conducting membrane and an electrode (anode and cathode) arranged on either side of the membrane. Moreover, gas diffusion layers (GDL) may be arranged on both sides of the membrane electrode assembly at the sides of the electrodes facing away from the membrane. In the operation of the fuel cell device with a plurality of fuel cells assembled into a fuel cell stack, the fuel, especially hydrogen $H_2$ or a hydrogen-containing gas mixture, is supplied to the anode, where an electrochemical oxidation of $H_2$ to $H^+$ takes place, giving off electrons. A transport of the protons $H^+$ from the anode space to the cathode space occurs via the electrolyte or the membrane, which electrically insulate and separate the reaction spaces from each other in gas-tight manner. The electrons provided at the anode are taken across an electrical line to the cathode. The cathode is supplied with oxygen or an oxygen-containing gas mixture, so that a reduction of $O_2$ to $O^{2-}$ takes place, taking up electrons. At the same time, these oxygen anions react in the cathode space with the protons transported across the membrane to form water.

The reaction gases are supplied to the electrodes of the fuel cells by means of bipolar plates. In addition to the reactant gases, a coolant is also taken through the bipolar plates on account of the heat generated during the fuel cell reaction, so that three different media are taken through the bipolar plates in the smallest of spaces.

When supplying the fuel cells with the reactants, the reactants are carried through main ducts (ports) into the bipolar plates. This is supposed to bring about a distribution of the reactants into an active region, in order to supply the entire surface of the electrodes as evenly as possible by means of a flow field. Since many bipolar plates with the membrane electrode assemblies are stacked in the fuel cell stack, seals are employed to seal off the main ducts lengthwise through the fuel cell stack. In addition, there must be a good seal against the coolant flowing in the coolant ducts.

At the inlet side of the active region, especially on the cathode side of the fuel cell, a relatively dry reactant flow is present, which may lead to a drying out of the inlet-side regions of the membrane of the fuel cell adjacent to the bipolar plate. In order to compensate for the effect of dry air at the inlet, humidifiers are therefore used in the system to increase the humidity of the air at the cathode inlet. These humidifiers require a significant volume and they may reduce the power density of the fuel cell system and increase the overall costs. The further this reactant flow penetrates into the flow ducts of the cathode-side reactant flow field, the more intensively it becomes humidified, since the fuel cell reaction results in the creation of product water.

In order to accomplish an equalization of the flow of the reactant on the cathode side, DE 10 2018 202 561 A1 proposes a bipolar plate for a fuel cell in which the active region of the flow field provides for a partitioning of its flow ducts into two smaller partial ducts. A similar configuration is to be found in the bipolar plate of US 2007/0 178 359 A1, but there are two sections in the active region that are separated from each other and have a different number of ducts, in order to accomplish here as well an equalization of the reactant flow. In DE 10 2008 033 211 A1 there is shown a bipolar plate in which the flow ducts provide a fanlike broadening, wherein the usable flow cross section of the ducts increases continuously from the inlet to the outlet for a more uniform distribution of the reactant.

Although solutions are already known which help in equalizing the flow of the respective reactant, a very large region at the inlet side, especially on the cathode side, still receives the flow of fresh cathode gas, so that an intense and active humidification of the cathode gas is required, before it is taken to the fuel cell stack.

BRIEF SUMMARY

Some embodiments include a bipolar plate for a fuel cell, which is formed with a first reactant flow field on its first plate side and which is formed with a second reactant flow field on its second plate side, situated opposite the first plate side. The flow fields comprise multiple flow ducts bounded by webs in an active region for one of the two reactants taking part in the fuel cell reaction, wherein each time the active region at the inlet side is fluidically connected via a distribution region running outside of the active region to an inlet-side media port for one of the two reactants, extending from the first plate side to the second plate side. Each time the active region at the outlet side is fluidically connected via a collection region running outside the active region to an outlet-side media port extending from the first plate side to the second plate side. Some embodiments relate to a fuel cell stack having such a bipolar plate.

Some embodiments provide a bipolar plate and a fuel cell stack having less need for a prehumidification of the reactants for an efficient operation of the fuel cells.

In some embodiments, at least one of the flow fields is formed with webs at the inlet side in its active region, which have a bearing surface for a neighboring layer of the fuel cell which is larger than a bearing surface of the outlet-side webs, resulting from a duct division of at least some of the flow ducts which is present in the active region.

Since the bearing surface of the webs bounding the flow ducts upstream from the duct division takes up a larger surface component, a kind of "moisture reservoir" is produced in this region on account of the large width of the webs there. In other words, not as much dry reactant will be given to the neighboring layers, such as the gas diffusion layer or the membrane electrode assembly, which might result in a drying out at these places. In this way, the humidifier volume can be reduced even to the point of being eliminated. Furthermore, with the chosen configuration of the reactant flow field there is a reduced number of flow ducts at the inlet side of the active region, so that the distribution region still lying upstream from the active region can also be implemented significantly more easily, i.e., with less complexity.

Of course, the term "active region" is to be understood as meaning that the bipolar plate itself is not chemically active, but that the electrochemical fuel cell reaction occurs there next to the reactant flow field.

In order to realize a reliable duct division, it may be advantageous for the flow ducts lying downstream from the duct division to run separated by an intermediate web. This intermediate web can likewise possess a much reduced surface of its backbone, so that the bearing surface downstream from the duct division is accordingly smaller in configuration and thereby ensures a reliable discharge of the product water formed during the fuel cell reaction.

A bearing surface which is reduced at the outlet side is also created in that the usable flow cross section of a flow duct lying upstream from the duct division is identical to the usable flow cross section of the flow duct lying downstream from the duct division.

Each of the inlet-side flow ducts may have a duct division, so that after the duct division there is a doubling of the flow ducts as compared to the number of ducts upstream from the duct division.

Depending on the operating conditions prevailing inside the fuel cell, it may be advantageous for only every second or every third flow duct of the number of inlet-side flow ducts to have a duct division.

The possibility exists of the duct division not only resulting in a doubling of the flow ducts, but also a tripling or quadrupling of them. In this context, an embodiment is therefore possible wherein the duct division produces a dividing of the portion of the flow duct upstream from the duct division into at least three flow ducts downstream from the duct division.

For an equalization of the water discharge, it may also be advantageous for the usable flow cross section of the inlet-side flow duct to increase continuously up to the duct division. Thus, in this way, the surface of the neighboring layer exposed to the flow is also increased, so that the degree of moistening correlates positively with the increase or decrease of this surface.

Thanks to the configuration with a reduced number of inlet-side flow ducts as compared to the number of outlet-side flow ducts, a number of feed ducts may correspond to the number of inlet-side flow ducts present in the distribution region, and, thanks to the reduced number of inlet-side flow ducts, the distribution region can be implemented much more easily and thus with less design space required.

The benefits, advantageous configurations and effects described in connection with the bipolar plate described herein hold equally for the fuel cell stack described herein, which likewise has less need for prehumidification.

The features and combinations of features mentioned above in the specification and also the features and combinations of features mentioned below in the description of the figures and/or shown only in the figures can be used not only in the particular indicated combination, but also in other combinations or standing alone. Thus, embodiments not explicitly shown or discussed in the figures, yet which emerge from and can be created from the explained embodiments by separate combinations of features should be seen as also being encompassed and disclosed herein.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
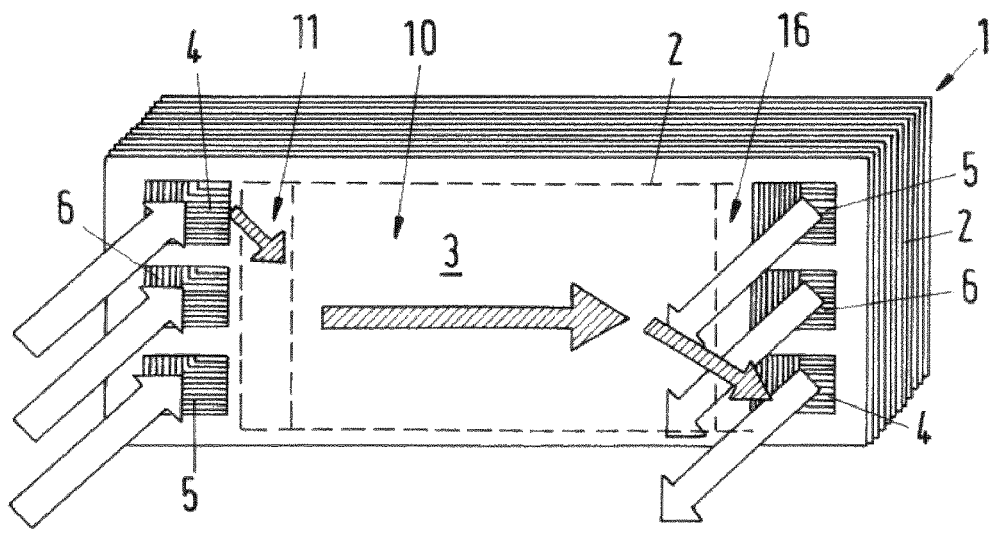
FIG. 1 shows a schematic perspective view of a fuel cell stack.

In FIGS. 2 to 7 are shown bipolar plates 2, which are used in a fuel cell stack 1 as represented in FIG. 1, and which consist of a plurality of fuel cells connected in series. Each of the fuel cells comprises an anode and a cathode as well as a proton-conducting membrane separating the anode from the cathode. The two electrodes along with the membrane form a membrane electrode assembly (MEA). The membrane is made from an ionomer, such as a sulfonated tetrafluorethylene polymer (PTFE) or a polymer of perfluorinated sulfonic acid (PFSA). Alternatively, the membrane can be made as a sulfonated hydrocarbon membrane.

Through anode spaces within the fuel cell stack, fuel (such as hydrogen) is supplied to the anodes. In a polymer electrolyte membrane fuel cell (PEM fuel cell), fuel or fuel molecules are split into protons and electrons at the anode. The membrane lets through the protons (such as $H^+$), but is impermeable to the electrons (e). The following reaction occurs at the anode: $2H_2 \rightarrow 4H^+ + 4e^-$ (oxidation/electron surrender). While the protons proceed through the membrane to the cathode, the electrons are taken by an external circuit to the cathode or to an energy accumulator. Through cathode spaces within the fuel cell stack, cathode gas (such as oxygen or air containing oxygen) can be supplied to the cathodes, so that the following reaction takes place at the cathode side: $O_2 + 4H^+ + 4e^- \rightarrow 2H_2O$ (reduction/electron uptake).

Air compressed by a compressor is supplied to the fuel cell stack 1 through a cathode fresh gas line. In addition, the fuel cell stack 1 is connected to a cathode waste gas line. At the anode side, hydrogen kept on hand in a hydrogen tank is supplied to the fuel cell stack 1 through an anode fresh gas line in order to provide the reactant necessary for the electrochemical reaction in a fuel cell. These gases are passed on to the bipolar plates 2, which have media ports 4, 5 for the distribution of the gases at the membrane or a neighboring gas diffusion layer and for the drainage. The flow of one of the two reactants, especially the cathode gas, is illustrated by the striped arrows running above the bipolar plate 2. Typically, a coolant is moreover taken through the bipolar plates 2, in order to carry away the heat produced during the fuel cell reaction; the latter is likewise brought in and taken out through media ports 6.

What all of these bipolar plates 2 have in common is that they are formed with a first reactant flow field 3 on their first plate side, and that they are formed with a second reactant flow field 3 at their second plate side, opposite the first plate side. The flow fields 3 each have multiple flow ducts 9 bounded by webs 7 in an active region for one of the two reactants taking part in the fuel cell reaction. The inlet-side media ports 4, 5 are fluidically connected at the inlet side to the active region 10, for which a distribution region 11 having feed ducts 15 and running outside the active region is used. The active region 10 is fluidically connected at the outlet side via a collection region 16 running outside the active region 10 to the outlet-side media ports 4, 5 extending from the first plate side to the second plate side.

In order to reduce the need for prehumidification of the reactants before they are brought into the active region 10, the bipolar plates 2 provide that at least one of their flow fields 3 is formed with webs 7 in its active region 10 at the inlet side which have a bearing surface 12 for a neighboring layer of the fuel cell which is larger than a bearing surface 13 of the outlet-side webs 7, which results from a duct division 14 of at least some of the flow ducts 9 in the active region 10.

In this way, at the inlet side of the active region 10 a larger region of the neighboring layer of the bipolar plate 2 is covered by the bearing surface 12 of the webs 7, so that this region acts as an additional "moisture reservoir," since no fresh reactant is provided here to the neighboring layer through the plate side. This has benefits in particular on the cathode side, since the fuel cell reaction has $H_2O$ as its produce, resulting in a saturation of the cathode intake air with increasing flow of the reactant through the reactant flow field 3.

Thanks to the smaller number of flow ducts 9 at the inlet side as compared to the number of flow ducts 9 at the outlet side in the active region 10, the distribution region 11 situated between the inlet-side media ports 4, 5 and the active region 10 can also be implemented much more easily and with a smaller design space requirement, especially when there is a number of feed ducts 15 corresponding to the number of inlet-side flow ducts 9 in the distribution region 11. The feed ducts in the present case are shown dashed, since they may also extend inside the body of the bipolar plate 2 before emerging onto the plate surface in the active region 10.

In the figures it can be seen that the flow ducts 9 lying downstream from the duct division 14 run separated by an intermediate web 8. The reduction of the outlet-side bearing surface 13 of the webs 7 is further enabled by the fact that the usable flow cross section of a flow duct 9 lying upstream from the duct division 14 is identical to the usable flow cross section of the flow duct 9 lying downstream from the duct division 14.

Figure 2:
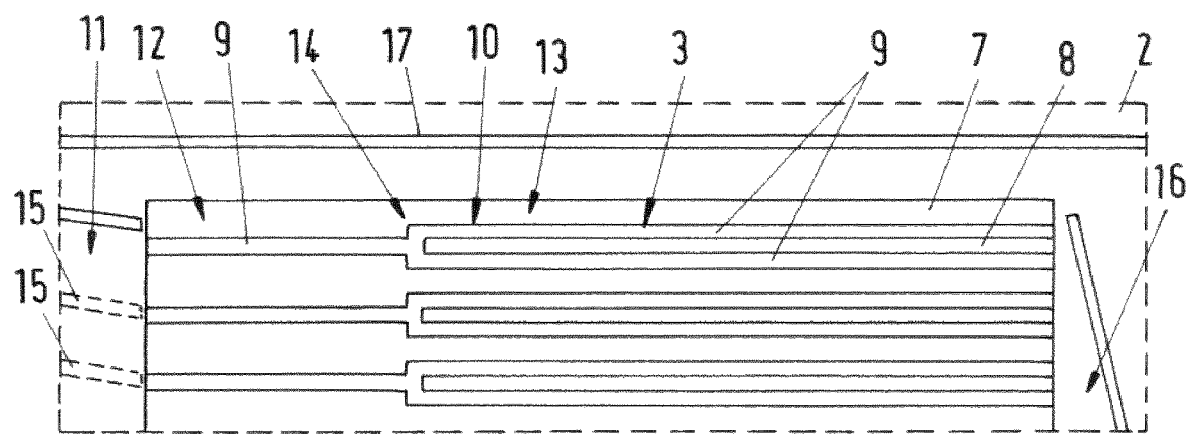
FIG. 2 shows a detailed view of a bipolar plate for the fuel cell stack of FIG. 1.

FIG. 2 shows the possibility of each of the inlet-side flow ducts 9 having a duct division 14.

Figure 3:
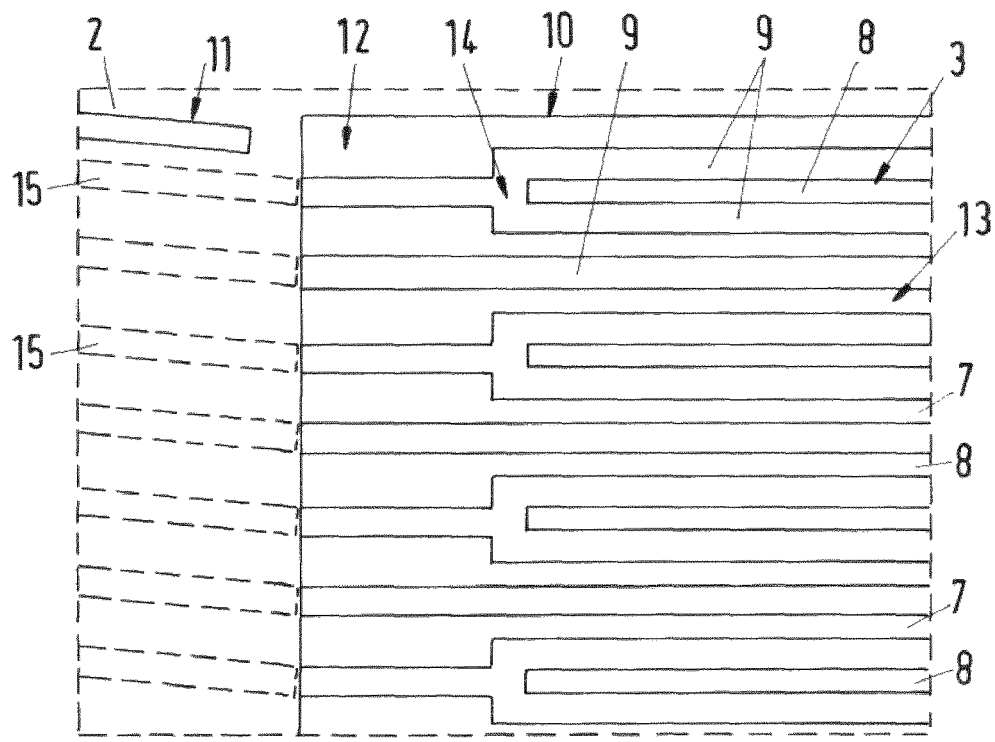
FIG. 3 shows a detailed view of another bipolar plate for the fuel cell stack of FIG. 1.

FIG. 3 shows the possibility that every second flow duct 9 of the number of inlet-side flow ducts 9 has a duct division 14.

Figure 4:
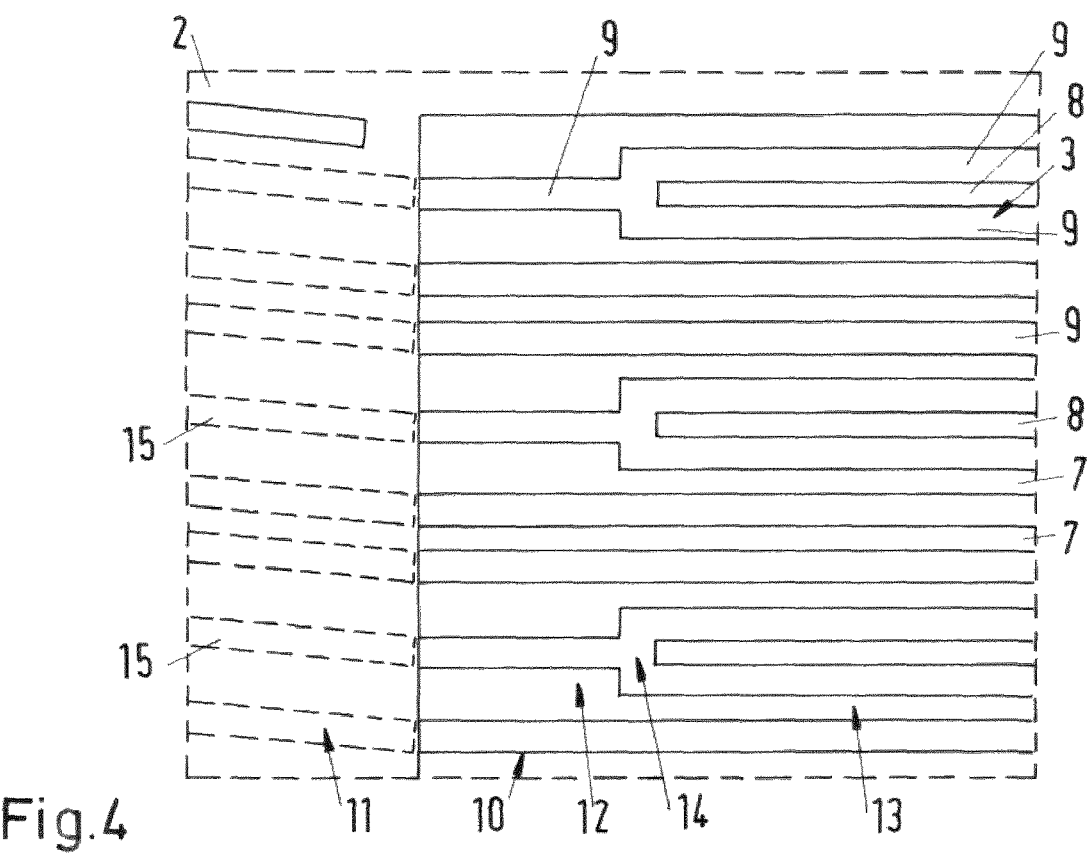
FIG. 4 shows a detailed view of yet another bipolar plate for the fuel cell stack of FIG. 1.

FIG. 4 shows the possibility that every third flow duct 9 of the number of inlet-side flow ducts 9 has a duct division 14.

Figure 5:
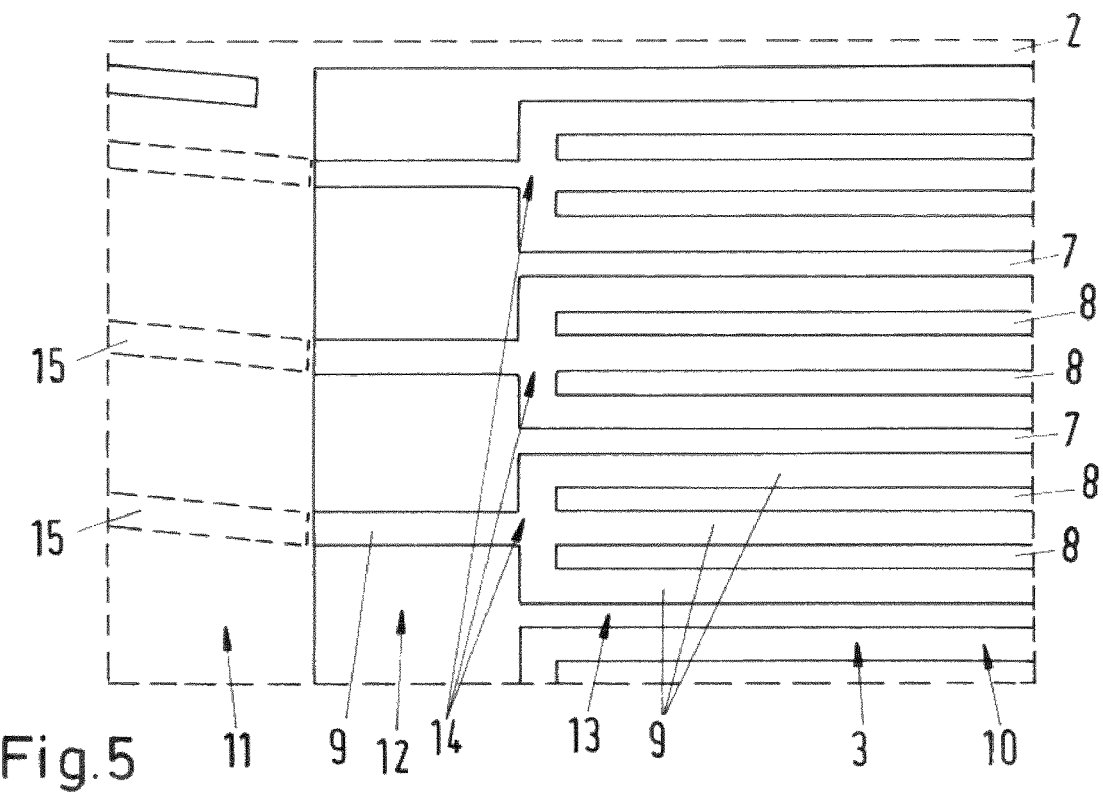
FIG. 5 shows a detailed view of yet another bipolar plate for the fuel cell stack of FIG. 1.

FIG. 5 shows the possibility that the duct division 14 produces a dividing of the portion of the flow duct 9 upstream from the duct division 14 into at least three flow ducts 9 downstream from the duct division 14. In the present instance, there are exactly three flow ducts 9 situated downstream from the duct division 14. These flow ducts 9 situated downstream from the duct division 14 are in turn each separated by an intermediate web 8.

Figure 6:
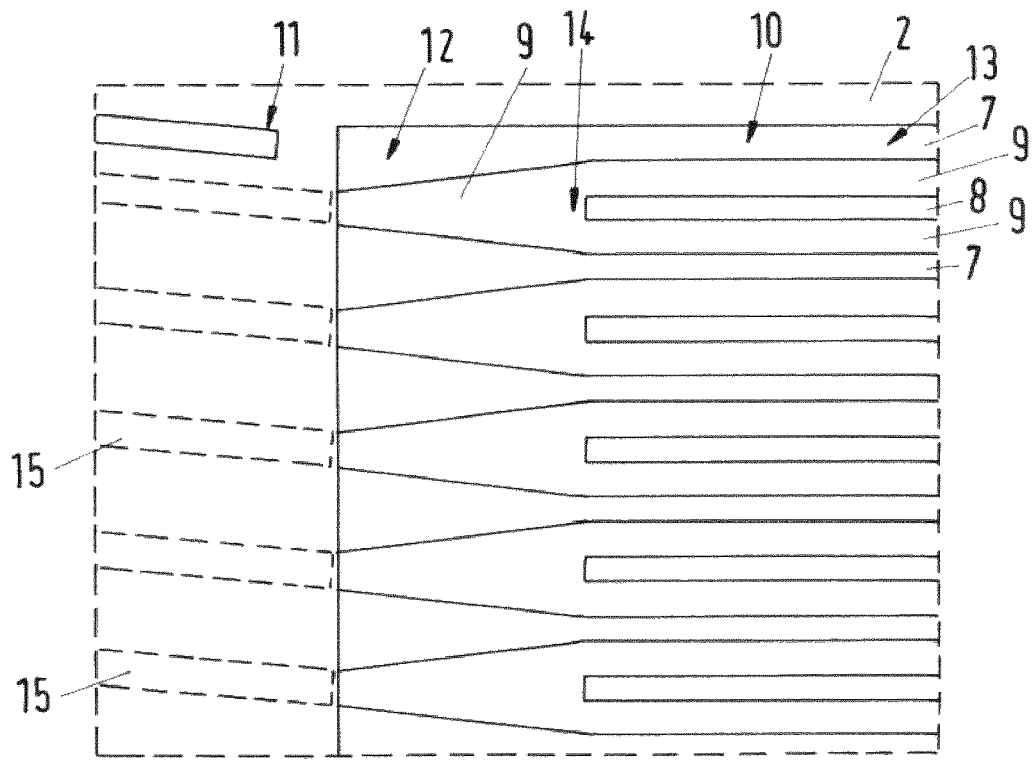
FIG. 6 shows a detailed view of yet another bipolar plate for the fuel cell stack of FIG. 1.

FIG. 6 shows the possibility that the usable flow cross section of the inlet-side flow duct 9 increases continuously up to the duct division 14. Conversely, the bearing surface 12 is also reduced in the course of the flow of the reactant up to the reduced surface portion of the bearing surface 13 downstream from the duct division 14.

Figure 7:
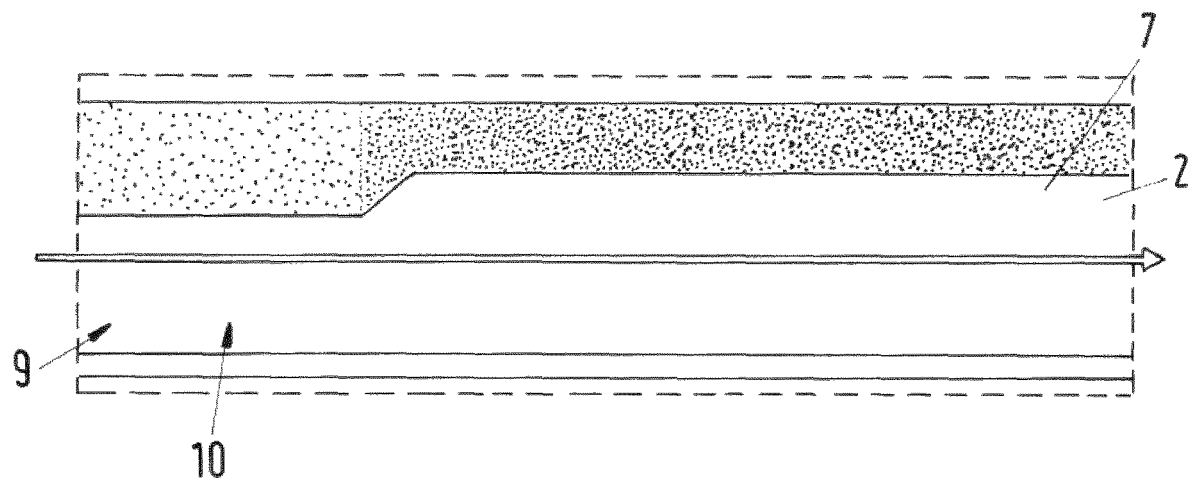
FIG. 7 shows a cross sectional detailed view of yet another bipolar plate for the fuel cell stack of FIG. 1.

The cross sectional view of FIG. 7 for the bipolar plate 2 furthermore shows the possibility that the flow duct 9 at the inlet side is formed with a duct depth which is less than the duct depth of the flow duct 9 at the outlet side, since in this way a different height of the webs 7 is produced, which results in a different pressure force on the neighboring layer, in the present instance a gas diffusion layer. Thus, in this way, a stronger pressure force is exerted on the neighboring gas diffusion layer due to a taller web 7 and the concomitant deeper flow duct 9, so that its porosity there is lower than that in the pressure force realized by the smaller duct depth, which therefore results in a higher porosity of the gas diffusion layer in this region.

As a result, the present bipolar plates 2 and thus a fuel cell stack 1 provided with them are characterized in that a kind of "moisture reservoir" is present in the active region 10 on the inlet side, resulting in less drying out of the nearby membrane. A more intense drying out would occur only at the outlet side of the active region 10, but this will be compensated by the product water occurring there.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate for a fuel cell, comprising:
   a first reactant flow field on a first plate side, and
   a second reactant flow field on a second plate side, situated opposite the first plate side,
   wherein the flow fields comprise multiple flow ducts bounded by webs in an active region for one of the two reactants taking part in a fuel cell reaction,
   wherein each time the active region at the inlet side is fluidically connected via a distribution region running outside of the active region to an inlet-side media port for one of the two reactants, extending from the first plate side to the second plate side, and wherein each time the active region the outlet side is fluidically connected via a collection region running outside the active region an outlet-side media port extending from the first plate side to the second plate side, and
   wherein at least one of the flow fields is formed with webs at the inlet side in its active region, which have a bearing surface for a neighboring layer of the fuel cell which is larger than a bearing surface of the outlet-side webs, resulting from a duct division at least some of the flow ducts which is present in the active region.

2. The bipolar plate according to claim 1, wherein the flow ducts lying downstream from the duct division run separated by an intermediate web.

3. The bipolar plate according to claim 1, wherein the usable flow cross section of a flow duct lying upstream from the duct division is identical to the usable flow cross section of the flow duct lying downstream from the duct division.

4. The bipolar plate according to claim 1, wherein each of the inlet-side flow ducts has a duct division.

5. The bipolar plate according to claim 1, wherein every second or every third flow duct of the number of inlet-side flow ducts has a duct division.

6. The bipolar plate according to claim 1, wherein the duct division produces a dividing of the portion of the flow duct upstream from the duct division into at least three flow ducts downstream from the duct division.

7. The bipolar plate according to claim 1, wherein the usable flow cross section of the inlet-side flow duct increases continuously up to the duct division.

8. The bipolar plate according to claim 1, wherein the flow duct at the inlet side is formed with a duct depth which is less than the duct depth of the flow duct at the outlet side.

9. The bipolar plate according to claim 1, wherein a number of feed ducts corresponding to the number of inlet-side flow ducts are present in the distribution region.

10. A fuel cell stack comprising a plurality of fuel cells having bipolar plates according to claim 1.

* * * * *